(12) United States Patent
Tokura et al.

(10) Patent No.: US 6,172,701 B1
(45) Date of Patent: Jan. 9, 2001

(54) LIGHT EMITTING ELEMENT ARRAY CHIP, LIGHT EMITTING ELEMENT ARRAY DRIVE IC AND PRINT HEAD

(75) Inventors: Kazuo Tokura; Yukio Nakamura; Mitsuhiko Ogihara; Masumi Taninaka, all of Tokyo (JP)

(73) Assignee: Oki Data Corporation, Tokyo (JP)

( * ) Notice: Under 35 U.S.C. 154(b), the term of this patent shall be extended for 0 days.

(21) Appl. No.: 09/106,088

(22) Filed: Jun. 29, 1998

(30) Foreign Application Priority Data

Jun. 30, 1997 (JP) .................................................... 9-173630

(51) Int. Cl.[7] ....................................................... B41J 2/47
(52) U.S. Cl. ............................................ 347/237; 347/145
(58) Field of Search .................................... 347/237, 247, 347/130, 145, 128; 257/88, 99

(56) References Cited

U.S. PATENT DOCUMENTS

| | | | |
|---|---|---|---|
| 4,596,995 | * 6/1986 | Yamakawa et al. | 347/237 |
| 4,689,694 | * 8/1987 | Yoshida | 347/237 |
| 4,998,119 | * 3/1991 | Collins et al. | 347/237 |
| 5,502,478 | 3/1996 | Mimura | 347/237 |
| 5,671,002 | * 9/1997 | Murano | 347/237 |
| 5,990,920 | * 11/1999 | Nagumo et al. | 347/237 |

FOREIGN PATENT DOCUMENTS

| | | |
|---|---|---|
| 367 550 | 5/1990 | (EP) . |
| 504 575 | 9/1992 | (EP) . |
| 704 915 | 4/1996 | (EP) . |
| 744 298 | 11/1996 | (EP) . |
| 62-152873 | 7/1987 | (JP) . |

OTHER PUBLICATIONS

Patent Abstracts of Japan, vol. 011, No. 385 (M–651), Dec. 16, 1987 & JP 62 152873 A (ALPS Electric Co. Ltd, Jul. 7, 1987, Abstract.

U.S. Patent application Ser. No. 08/900,064, filed Jul. 23, 1997, pp. 1–51. "High Density LED Array Utilizing a Plurality of Isolation Channels".

* cited by examiner

Primary Examiner—N. Le
Assistant Examiner—Lamson D. Nguyen
(74) Attorney, Agent, or Firm—Venable; Norman N. Kunitz

(57) ABSTRACT

To achieve a reduction in the size of the print head and a reduction in the cost, LED array chips 1 achieved by matrix-connecting M×N LED elements 2 with M pad electrodes to be scanned 4 and N pad electrodes to be driven 3 and LED array drive ICs 10 are mounted at a mounting substrate 41. The pad electrodes to be driven 3 are connected with drive pad electrodes 16 and the pad electrodes to be scanned 4 are connected with scan pad electrodes 17 through wires 42a and 42b respectively. The pad electrodes to be driven 3 and the pad electrodes to be scanned 4 are provided in a single row along one side or edge of the lengthwise side of the chip. The LED array drive ICs 10 are provided with a scan control unit that sequentially validates the M pad electrodes to be scanned 4 one at a time based upon a scan signal and a data control unit that supplies drive currents to the N pad electrodes to be driven 3 in conformance to individual sets of data to cause N LED elements 2 connected with a valid pad electrode to be scanned 4 to emit light, each time the valid pad electrode to be scanned 4 is switched.

23 Claims, 9 Drawing Sheets

LIGHT EMITTING ELEMENT ARRAY CHIP, LIGHT EMITTING ELEMENT ARRAY DRIVE IC AND PRINT HEAD

BACKGROUND OF THE INVENTION

The present invention relates to a print head that is employed as a exposure light source for forming an electrostatic latent image on a photosensitive body in a printing apparatuses such as printers and facsimile machines adopting the electrophotographic printing system, and the present invention also relates to a matrix-type light emitting element array chip to constitute the print head and a light emitting element array drive IC that drives the matrix-type light emitting element array chip.

Print heads that are employed as an exposure light source for a photosensitive body in a printing apparatus adopting the electrophotographic printing system in the prior art include those that use as a light source, a light emitting element array constituted by providing a number of light emitting elements such as semiconductor laser elements, LED elements and the like in a single row, and those that use a fluorescent light, a cold-cathode tube or the like as a light source and use a liquid crystal element as a shutter. Those different types of print heads all selectively expose the photosensitive body that has been uniformly charged by a charger with the light source to form an electrostatic latent image on the photosensitive body.

In this document, a light emitting element array achieved by providing a great number of LED elements is referred to as an LED array, and a print head constituted with an LED array is referred to as an LED print head. An LED print head may be constituted by mounting on a mounting substrate LED array chips each achieved by providing a great number of LED elements on a single semiconductor chip and light emitting element array drive ICs each provided for controlling light emission of the individual LED elements in each of the LED array chips, in quantities that correspond to the printing width.

FIG. 8 is a top view illustrating the structure of an LED array chip in the prior art. The LED array chip 51 illustrated in FIG. 8 is provided with LED elements 52 provided in a single row, individual pad electrodes to be driven 53 that are individually connected to the anodes of the LED elements 52 and a common electrode 54 that is connected to the cathodes of all the LED elements 52. The common electrode 54 is provided at the rear surface of the LED array chip 51. In addition, FIG. 9 is a partial enlargement of an LED print head in the prior art mounted with the LED array chip illustrated in FIG. 8. The LED print pad illustrated in FIG. 9 is constituted by mounting the LED array chip 51 and an LED array drive IC 55 for driving the LED array chip 51 at a mounting substrate 59. The individual pad electrodes to be driven 53 of the LED array chip 51 and drive pad electrodes 60 of the LED array drive IC 55 are connected with each other through metal wires 56, and I/O pad electrodes 61 of the LED array drive IC 55 are connected with wiring patterns (conductive patterns) 62 for control signals and the source formed at the mounting substrate 59. The common electrode 54 formed at the rear surface of the LED array chip 51 is connected to a cathode wiring pattern (conductive pattern) 58 formed at the mounting substrate 59.

Individual sets of data corresponding to the LED elements 52 at the LED array chip 51, a strobe signal for controlling the light emission time for the LED elements and the like are input through the LED array drive IC 55. The LED array drive IC 55 is provided with a shift register that stores individual sets of data that have been input, drive current source circuits each of which outputs a drive current corresponding to one of the individual sets of data and switching circuits that turn ON/OFF between the output terminals of the drive source circuit and the drive pad electrodes 60 in conformance with the strobe signal that has been input. The number of shift register stages, the number of drive current source circuits, the number of switching circuits and the number of drive pad electrodes 60 all correspond to the number of LED elements 52 at the LED array chip 51. In the LED array drive IC 55, a drive current is output by, for instance, the drive current source circuit corresponding to the printing data that indicate light emission, and with the switching circuits set to ON while the strobe signal is at "H" level, the drive current is supplied to the LED elements 52 that correspond to the printing data at "L" level via the individual pad electrodes 53 to be driven to achieve selective light emission. Thus, in the LED print head of the prior art, the anodes of the LED elements 52 at the LED array chip 51 are connected to the individual pad electrodes 53 to be driven (the drive pad electrodes 60 at the drive IC 55) on a one-to-one basis.

However, as the high density of the LED elements at an LED array chip increases (achieving a dot density of 600 DPI and an LED element pitch of 42.3 micrometer, for instance), it becomes increasingly difficult to individually connect the individual pad electrodes to be driven 53 and the drive pad electrodes 60 that are provided in correspondence to LED elements 52 on a one-to-one basis through wire bonding. A matrix-type LED array chip, such as that disclosed in Japanese Unexamined Patent Publication No. 1987-152873 provides a solution to this problem.

In a matrix-type LED array chip, matrix-connections are achieved between M×N light emitting elements and M pad electrodes to be scanned connected to the cathodes of the light emitting elements and between the light emitting elements and N pad electrodes to be driven connected to the anodes of the light emitting elements, in order to reduce the number of pad electrodes in the LED array chip. A matrix-type LED array chip may assume a structure, for instance, in which, a semiconductor chip is divided into M semiconductor blocks, a pad electrode to be scanned and N light emitting elements are formed on each semiconductor block and N pad electrodes to be driven are formed on the M semiconductor blocks, with the cathodes of the N LED elements within each block connected with the pad electrode to be scanned within the block and the anodes of the N LED elements within the block individually connected with different pad electrodes to be driven.

However, in a print head employing the matrix-type light emitting element array chip in the prior art described above, it is necessary to mount two types of drive circuits (drive ICs), i.e., a data control circuit (data control IC) that controls the pad electrodes to be driven in correspondence to individual sets of data and a scan control circuit (scan control IC) for scanning the pad electrodes to be scanned at a mounting substrate and to bond between the pad electrodes to be driven and the data control circuit and between the pad electrodes to be scanned and the data control circuit with metal wires, and this poses an obstacle in achieving a reduction in the size of the print head. It also presents a stumbling block in achieving a reduction in the number of manufacturing steps for manufacturing the print head and a reduction in the manufacturing cost. Since, for instance, a structure in which a light emitting element array chip constituted by providing the pad electrodes to be driven and the pad electrodes to be scanned on either side of the row of light emitting elements is used, a data control circuit and a scan control circuit are mounted at the sides of the light emitting element array chip and the metal wires are drawn out from the two sides of the light emitting element array chip, must be adopted, the size of the print head cannot be reduced and the number of wire bonding steps cannot be reduced either.

SUMMARY OF THE INVENTION

An object of the present invention, which has been completed to address the problems in the prior art discussed above, is to provide a new and improved light emitting element array chip and a new and improved light emitting element array drive IC that achieve a reduction in the print head size and a reduction in production costs.

Another object of the present invention is to provide a new and improved light emitting element array chip and a new and improved light emitting element array drive IC, that make it possible to directly bond the light emitting element array chip to the light emitting element array drive IC from one side of the chip so that the number of wiring patterns (conductive patterns) at the mounting substrate can be reduced.

Yet another object of the present invention is to provide a new and improved light emitting element array chip and a new and improved light emitting element array drive IC, that preclude the necessity for mounting two types of drives ICs, i.e., an operation control IC and a data control IC, when mounting the light emitting element array chip, to achieve a reduction in the number of drive ICs.

Still another object of the present invention is to provide a new and improved light emitting element array chip and a new and improved light emitting element array drive IC that achieve an improvement in the reliability of the product through direct bonding of the light emitting element array chip to the light emitting element array drive IC.

A still further object of the present invention is to provide a new and improved light emitting element array chip and a new and improved light emitting element array drive IC that make it possible to improve the per line printing speed when they are employed in a printer head of printing apparatuses such as printers, facsimile machines and the like adopting the electrophotographic printing system.

In order to achieve the objects described above, the light emitting element array chip according to the present invention, which is provided with a plurality of pad electrodes to be scanned to which first electrodes of light emitting elements are connected, a plurality of pad electrodes to be driven to which second electrodes of the light emitting elements are connected and a plurality of the light emitting elements provided in a single row and is constituted by matrix-connecting the first electrodes and the second electrodes of the plurality of light emitting elements to the pad electrodes to be scanned and the pad electrodes to be driven, is characterized in that the plurality of pad electrodes to be scanned and the plurality of pad electrodes to be driven are positioned along one side or edge on the lengthwise side of the chip.

The light emitting element array drive IC according to the present invention, which is a light emitting element array drive IC that drives a light emitting element array achieved by matrix-connecting M×N light emitting elements to M pad electrodes to be scanned and N pad electrodes to be driven, is characterized in that it is provided with a scan control unit which performs scanning of the M pad electrodes to be scanned by sequentially validating the M pad electrodes to be scanned one at a time with the timing corresponding to a scan signal input from the outside and a data control unit that, each time the valid pad electrode to be scanned is switched, selectively drives the N pad electrodes to be driven based upon the individual sets of data corresponding to the light emitting elements input from the outside to selectively cause the N light emitting elements connected with the pad electrodes to be scanned that have become valid to emit light.

In addition, the print head according to the present invention, which is provided with a light emitting element array chip constituted by matrix-connecting M×N light emitting elements to M pad electrodes to be scanned and N pad electrodes to be driven, a light emitting element array drive circuit that drives the light emitting element array chip and a mounting substrate on which the light emitting element array chip and the light emitting element array drive circuit are mounted, is characterized in that the light emitting element array chip according to the present invention is employed to constitute the light emitting element array chip or that the light emitting element array drive IC according to the present invention is employed to constitute the light emitting element array drive IC.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

DETAILED DESCRIPTION OF THE PREFERRED EMBODIMENT

The following is a detailed explanation of the preferred embodiment of the light emitting element array and the light emitting element array drive IC according to the present invention in reference to the attached drawings.

Figure 1:
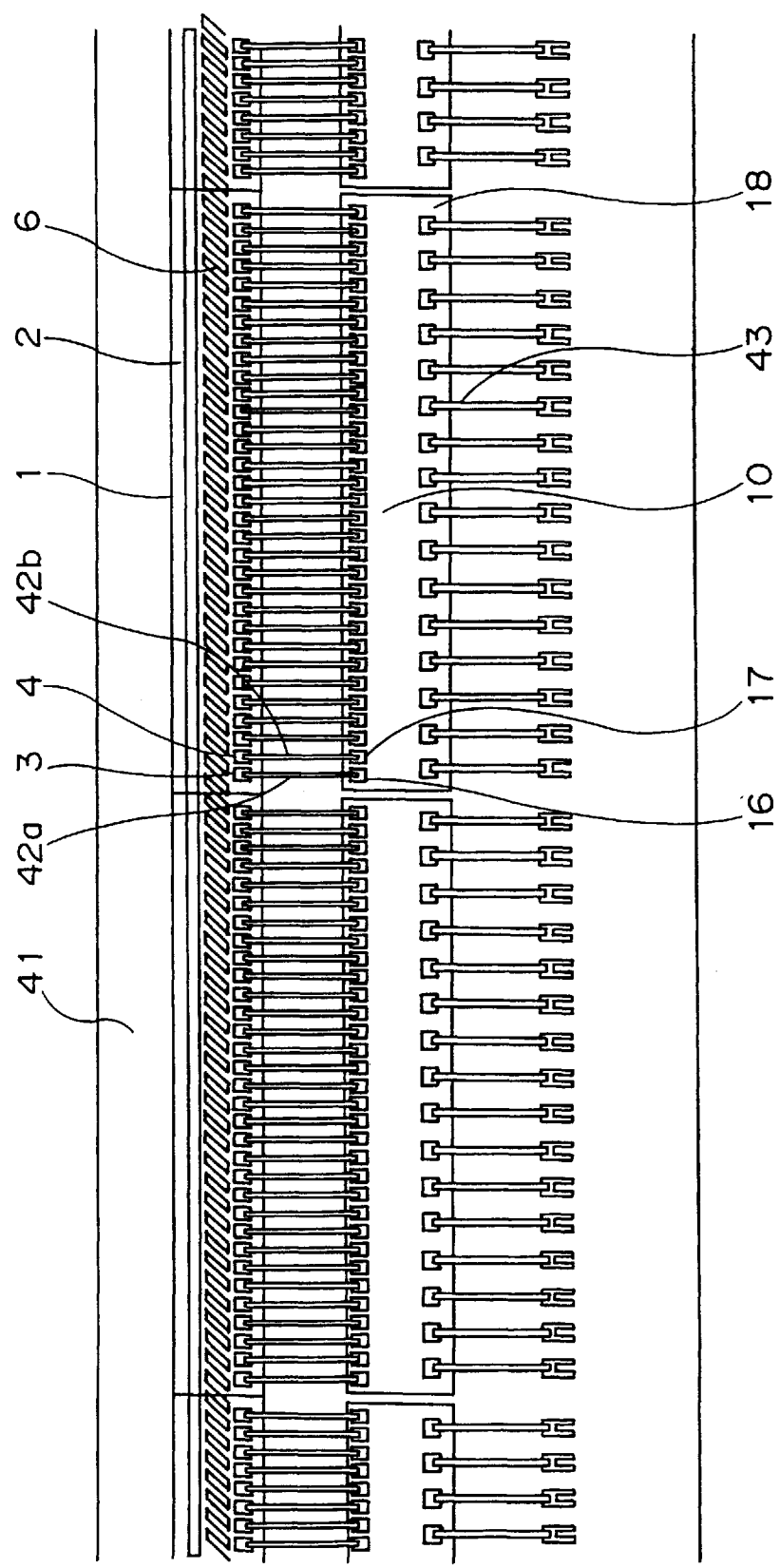
FIG. 1 is a top view illustrating the structure of a print head in the embodiment of the present invention.
Figure 2:
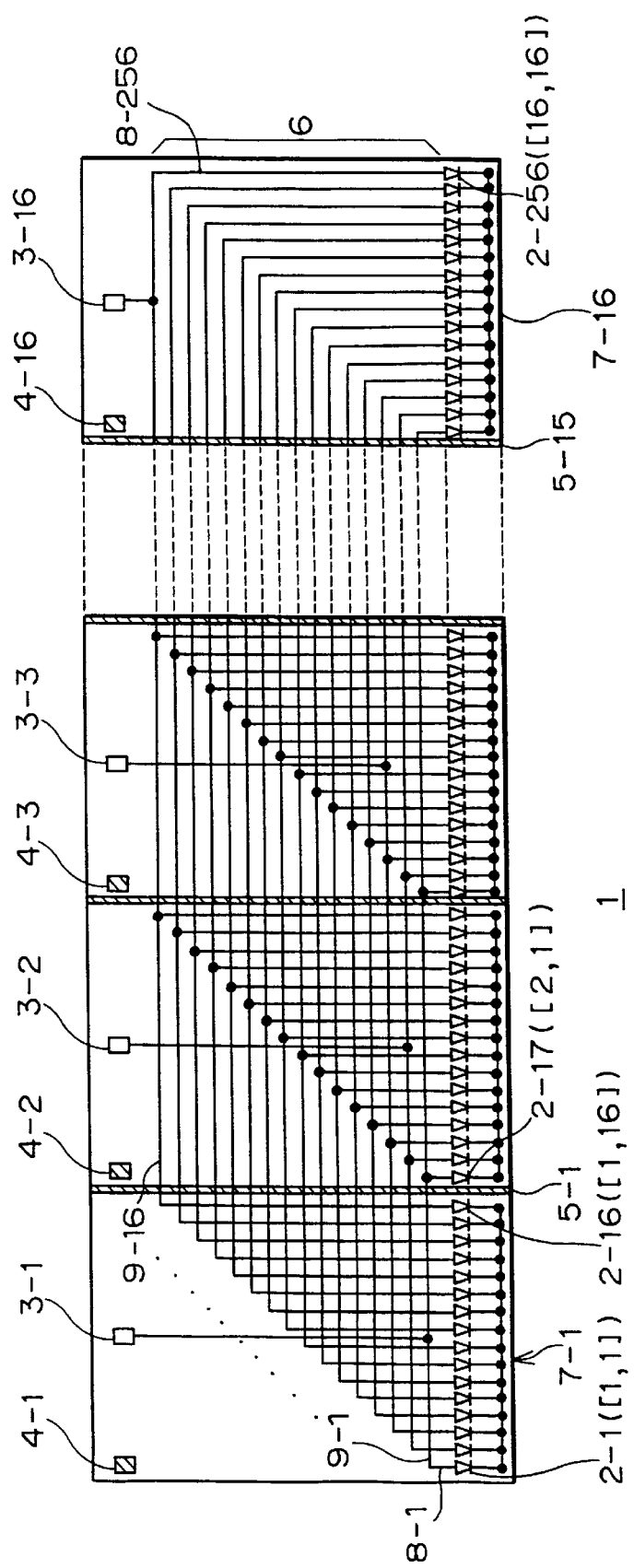
FIG. 2 is a top view illustrating the structure of an LED array chip constituting the print head in the embodiment of the present invention.
Figure 3:
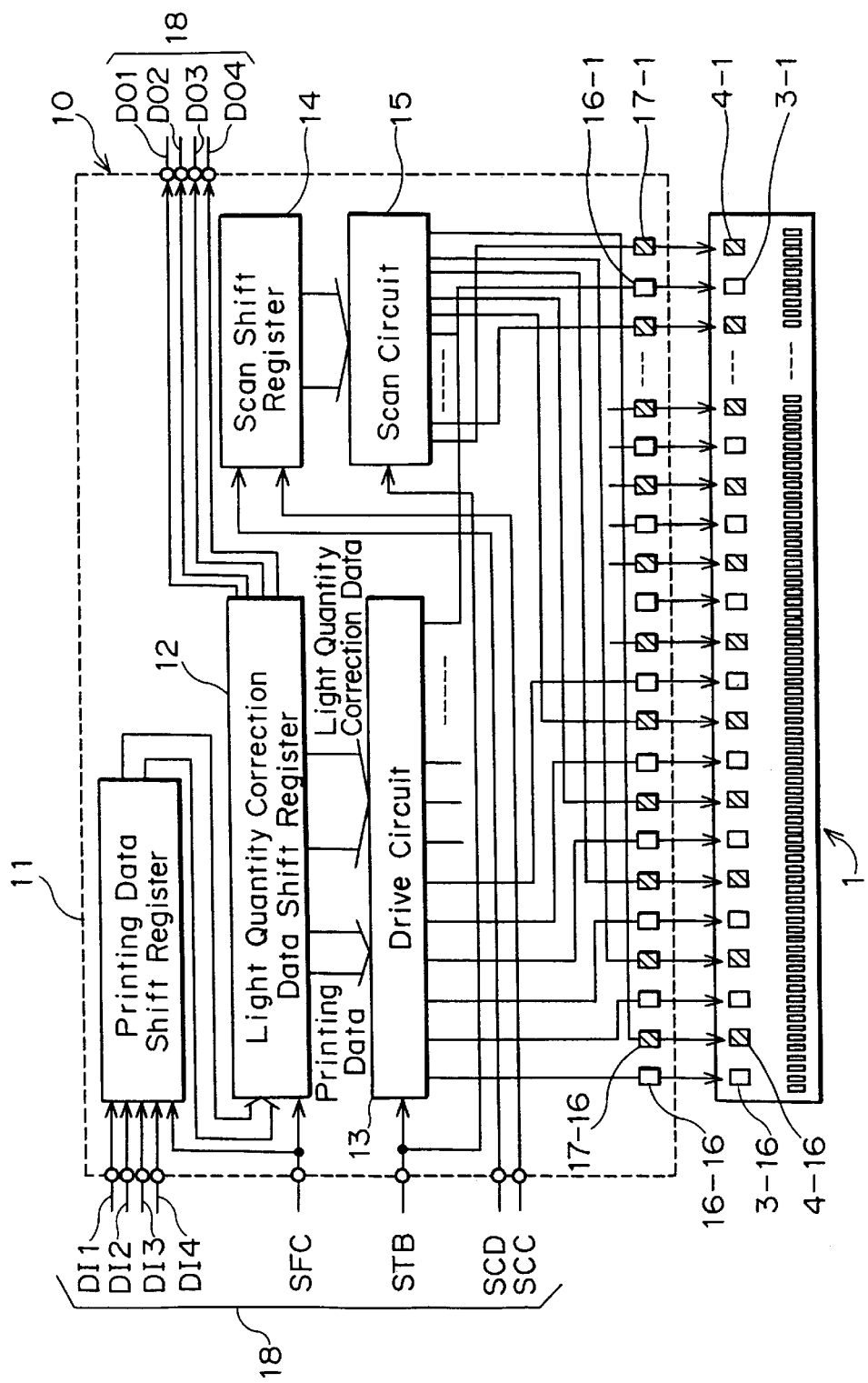
FIG. 3 is a block diagram illustrating the structure of an LED array drive IC constituting the print head in the embodiment of the present invention.

FIG. 1 is a top view illustrating the structure of an LED print head in the embodiment of the present invention. The LED print head in FIG. 1 is constituted by mounting a plurality of matrix-type LED array chips 1 and a plurality of LED array drive ICs 10 at a mounting substrate 41. In addition, FIG. 2 is a top view illustrating the structure of each LED array chip 1 and FIG. 3 is a block diagram of each LED array drive IC 10. Pad electrodes to be driven 3 at an LED array chip 1 are connected with drive pad electrodes 16 of LED array drive IC 10 through metal wires 42a, whereas pad electrodes to be scanned 4 at the LED array chip 1 are connected with scan pad electrodes 17 of the LED array drive IC 10 through metal wires 42b. In addition, the wiring pattern (conductive pattern) for signals, sources and the like (not shown) provided on the mounting substrate 41 is connected with an I/O pad electrode 18 of the LED array drive IC 10 through metal wire 43.

FIG. 2 schematically illustrates the wiring pattern (conductive pattern) of the LED array chip 1 according to the present invention. In this embodiment, the first conduction-side (referred to as the cathode side in reference to this embodiment) of 256 LEDs, i.e., LEDs 2-1 through 2-256, are divided into 16 blocks each constituted of 16 LEDs. Namely, the 16 LEDs within the first block constitute a common cathode side and this common cathode 7-1 is connected at a scan pad electrode 4-1. Likewise, common cathodes 7-2, 7-3, . . . , 7-16 are respectively connected at scan pad electrodes 4-2, 4-3, . . . , 4-16. Separating areas 5-1 through 5-15 are provided to electrically isolate the common cathodes 7-1 through 7-16 from one another. Anode-side common wirings (conductive patterns) 9 connect LEDs of the same order among the individual blocks through anode-side individual electrode wirings (conductive patterns) 8 provided in correspondence to the individual LEDs at the second conduction-side (referred to as anode-side in reference to this embodiment). Namely, the anode-side individual wirings (conductive patterns) 8-1, 8-17, . . . , 8-241 of LED (1,1) LED (2,1), . . . , LED (16,1) are connected at the anode-side common wiring (conductive pattern) 9-1, the anode-side individual wirings (conductive patterns) 8-2, 8-18, . . . , 8-243 of LED (1,2) LED(2,2), . . . LED (16,2) are connected at the anode-side common wiring (conductive pattern) 9-2 and so forth so that LEDs of the same order among the individual blocks are connected at 16 anode-side common wirings (conductive patterns). Furthermore, the anode-side common wirings (conductive patterns) 9-1 through 9-16 are respectively connected at drive pad electrodes 3-1 through 3-16. In reference to the present invention, the LED array chip according to the present invention structured as described above is defined as a matrix LED array. In addition, the wiring (conductive pattern) achieved as described above is defined as a matrix conductive pattern. Also, the connections of the common wiring (conductive pattern) 7 at the first electrode side with the scan pad electrodes 4 and of the individual wirings (conductive patterns) 8 at the second conduction-side connected at the second conduction-side common wirings (conductive patterns) 9 which are connected to the individual drive pad electrodes 3 in matrix wiring (conductive pattern) are generically termed as matrix connections of the first conduction-side electrodes (hereafter referred to as the first electrodes) to the scan pad electrodes and of the second conduction-side individual electrodes (hereafter referred to as the second electrodes) to the drive pad electrodes. Moreover, the wiring (conductive pattern) formation area for the second electrodes 8-1, 8-2, . . . , 8-16 and the second conduction-side common wirings (conductive patterns) 9-1, 9-2, . . . 9-16 is defined as a matrix conductive pattern area 6.

To describe the example above in more general terms, when there are M first conduction-side blocks achieved by dividing the first conductive type semiconductor area with element separating areas and there are N LEDs present within each first conduction side block, the LED array according to the present invention is referred to as an M×N matrix LED array chip. There are M×N LEDs present within the M×N matrix LED array chip and LEDs 2-(i, 1) through 2-(i, N) ($1 \leq i \leq M$) are commonly connected at their first conduction-side, constituting a first electrode 7-i which is connected to a scan pad electrode 4-i, with second electrodes 8-(i, j) ($1 \leq i \leq M$) of the individual LEDs 2-(1, j) through 2-(M, j) ($1 \leq j \leq N$) connected at a second conduction-side common wiring (conductive pattern) 9-j, which is connected at a drive pad electrode 3-j. In the specific example presented in the previous paragraph, M=N=16.

At a block 7-i (i represents one of the integers among 1 through M), N LED elements 2-(i, 1) through 2-(i, N) and a pad electrode to be scanned 4-i are formed. The pad electrode to be scanned 4-i is connected to the cathodes (first electrodes) of the LED elements 2-(i, 1) through 2-(i, N) formed at the block 7-i. In addition, N pad electrodes to be driven 3-1 through 3-N are formed at the LED array chip 1. A pad electrode to be driven 3-j (j represents one of the integers among 1 through N) is connected to the anodes (second electrodes) of the M LED elements 2-(1, j), 2-(2, j) . . . 2-(M, j) through the matrix wiring (conductive pattern) portion 6. In this embodiment, a pad electrode 3-i is formed at the block 7-i.

The LED array chip 1 is characterized in that the pad electrodes to be driven 3-1 through 3-N and the pad electrodes to be scanned 4-1 through 4-M are positioned in a single row along one side or edge in the lengthwise direction of the LED array chip 1. In FIG. 2, the pad electrodes to be driven 3 and the pad electrodes to be scanned 4 are positioned alternately. It is to be noted that the pad electrodes to be driven 3-1 through 3-N and the pad electrodes to be scanned 4-1 through 4-M may be each provided in single file. In addition, the pad electrodes to be driven 3-1 through 3-N and the pad electrodes to be scanned 4-1 through 4-M may be positioned over two rows (each row will comprise the pad electrodes to be driven 3 and the pad electrodes to be scanned 4).

The blocks 7 are constituted by, for instance, growing an n-type semiconductor layer on a semi-insulating semiconductor substrate and dividing the n-type semiconductor layer into M n-type semiconductor blocks with separating grooves (isolation grooves) 5. The LED elements 2 may each be constituted by, for instance, forming a p-type semiconductor area which will constitute an anode at the n-type semiconductor block which will constitute a cathode. It is to be noted that the blocks 7 may be constituted as p-type semiconductor blocks, with the anodes of the LED elements connected to the pad electrodes to be scanned and their cathodes connected to the pad electrodes to be driven, instead. In that case, the anodes of the LED elements constitute first electrodes and their cathodes constitute second electrodes.

The operation of the LED array chip 1 is now explained. The 256 LED elements 2-(1, 1) through 2-(16, 16) of the LED array chip 1 each separately engage in a light emitting operation. For instance, with current sources corresponding to the individual sets of data of the LED elements 2-(i, 1) through 2-(i, 16) connected to the pad electrodes to be driven 3-1 through 3-16 respectively, and the pad electrode to be scanned 4-i connected to the GND the LED elements 2-(i, 1) through 2-(i, 16) of the block 7-i are selectively caused to engage in a light emitting operation in correspondence to the individual sets of data. By sequentially implementing the procedure described above for the blocks 7-1 through 7-M, the 256 LED elements 2 are caused to individually engage in a light emitting operation.

As illustrated in FIG. 3, the LED array drive IC 10 is provided with a printing data shift register 11 (drive data shift register), a light quantity correction data shift register 12, a drive circuit 13 (means for drive), a scan data shift register 14, a scan circuit 15 (means for scanning), drive pad electrodes 16-1 through 16-N and scan pad electrodes 17-1 through 17-M. The printing data shift register data 11, the light quantity correction data shift register 12 and the drive circuit 13 constitute a data control unit. In addition, the scan data shift register 14 and the scan circuit 15 constitute a scan control unit.

The LED array drive IC 10 is also provided with an I/O pad electrode 18 that is connected with the wiring (conductive pattern) pattern at the mounting substrate 41 illustrated in FIG. 1. The I/O pad electrode 18 is provided with four data input terminals DI1 through DI4 through which individual sets of data corresponding to the LED elements (printing data and light quantity correction data) are input, a shift clock input terminal SFC to which a shift clock is input, a scan clock input terminal SCC through which a scan clock is input, a strobe input terminal STB through which a strobe signal is input, a scan data input terminal SCD through which scan data are input and four data output terminals D01 through D04. The scan data and the scan clock constitute a scan signal.

The data control unit and the scan control unit are both internally provided at the LED array drive IC 10 so that it can drive the matrix-type LED array chip 1 by itself.

Figure 4:
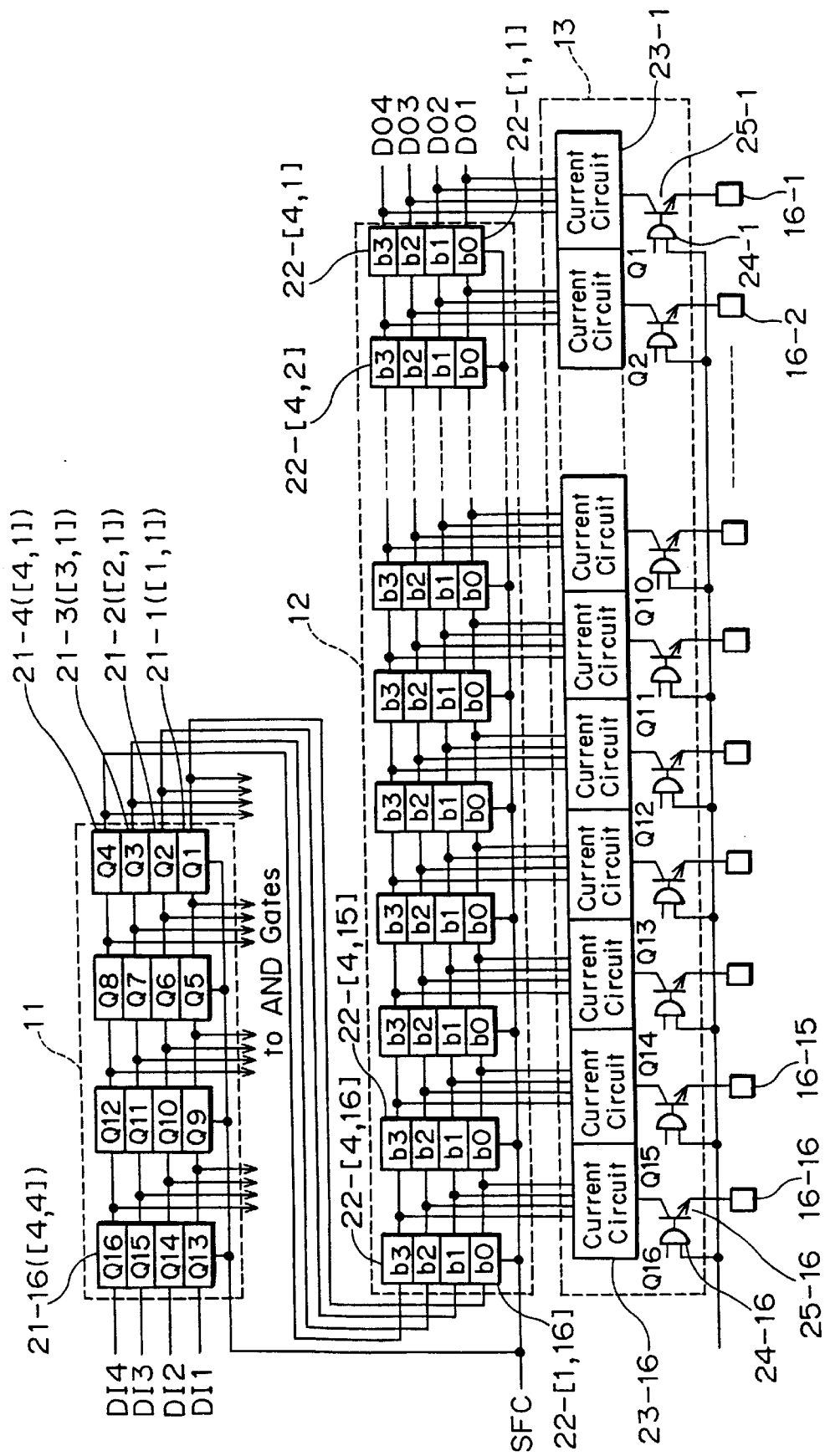
FIG. 4 is a block diagram of the data control unit in the LED array drive IC constituting the print head in the embodiment of the present invention.

FIG. 4 illustrates the structure of the data control unit of the LED array drive IC 10. As shown in FIG. 4, the printing data shift register 11 is provided with R×S (R represents an integer which is equal to the number of the data input terminals DI at the LED array drive IC 10, S represents a positive integer and R×S represents an integer equal to or larger than N) D flipflops. Hereafter, these R×S flipflops 21 are indicated as 21-1 through 21-(R×S) or 21-(1, 1) 21-(2, 1) . . . 21-(R, 1), 21-(1, 2) . . . 21-(R, S). In FIG. 4, R=S=4 and R×S=N=16. The D flipflops 21-(k, 4) through 21-(k, 1), (k represents one integer among 1 through R) are connected in series, and the data input terminal of the D flipflop 21-(k. 4) at the first stage is connected to the data input terminal D 1k. In addition, the clock input terminals of the 16 D flipflops 21-1 through 21-16 are commonly connected to the shift clock input terminal SFC.

The light quantity correction shift register 12 is provided with R×N D flipflops 22-(1, 1) through 22-(R, N). The D flipflops 22-(k, 16) through 22-(k, 1) are connected in series, and the data input terminals of the D flipflops 22-(k, 16) at the first stage is connected to the data output terminal of the D flipflop 21-(k, 1) of the printing data shift register 11, whereas the data output terminal of the D flipflop 22-(k, 1) at the last stage is connected with the data output terminal DOk. In addition, the clock input terminals of the D flipflops 22-(1, 1) through 22-(4, 16) are commonly connected with the shift clock input terminal SFC. Thus, the printing data shift register 11 and the light quantity correction shift register 12 are connected in series.

The drive circuit 13 is provided with drive current source circuits 23-1 through 23-N (drive source circuits), AND gates 24-1 through 24-N and switching transistors 25-1 through 25-N. The drive current source circuit 23-i is provided with four light quantity correction data input terminals and a drive current output terminal, with the four light quantity correction data input terminals respectively connected with the data output terminals of the D flipflops 22-(1, i) through 22-(4, i). The drive current source circuit 23-i sets a drive current value that corresponds to the light quantity correction data that have been input and outputs the drive current at this value through its drive current output terminal. First input terminals of the AND gates 24-1 through 24-N are commonly connected to the strobe input terminal STB. In addition, the second input terminal of the AND gate 24-i is connected to the data output terminal of the D flipflop 21-i. The base terminal of the switching transistor 25-i is connected to the output terminal of the AND gate 24-i, with the collector connected to the output terminal of the drive current source circuit 23-i and the emitter terminal connected to a constant current output electrode 16-i. The AND gate 24-i and the switching transistor 25-i constitute a switching circuit of the data control unit.

Figure 5:
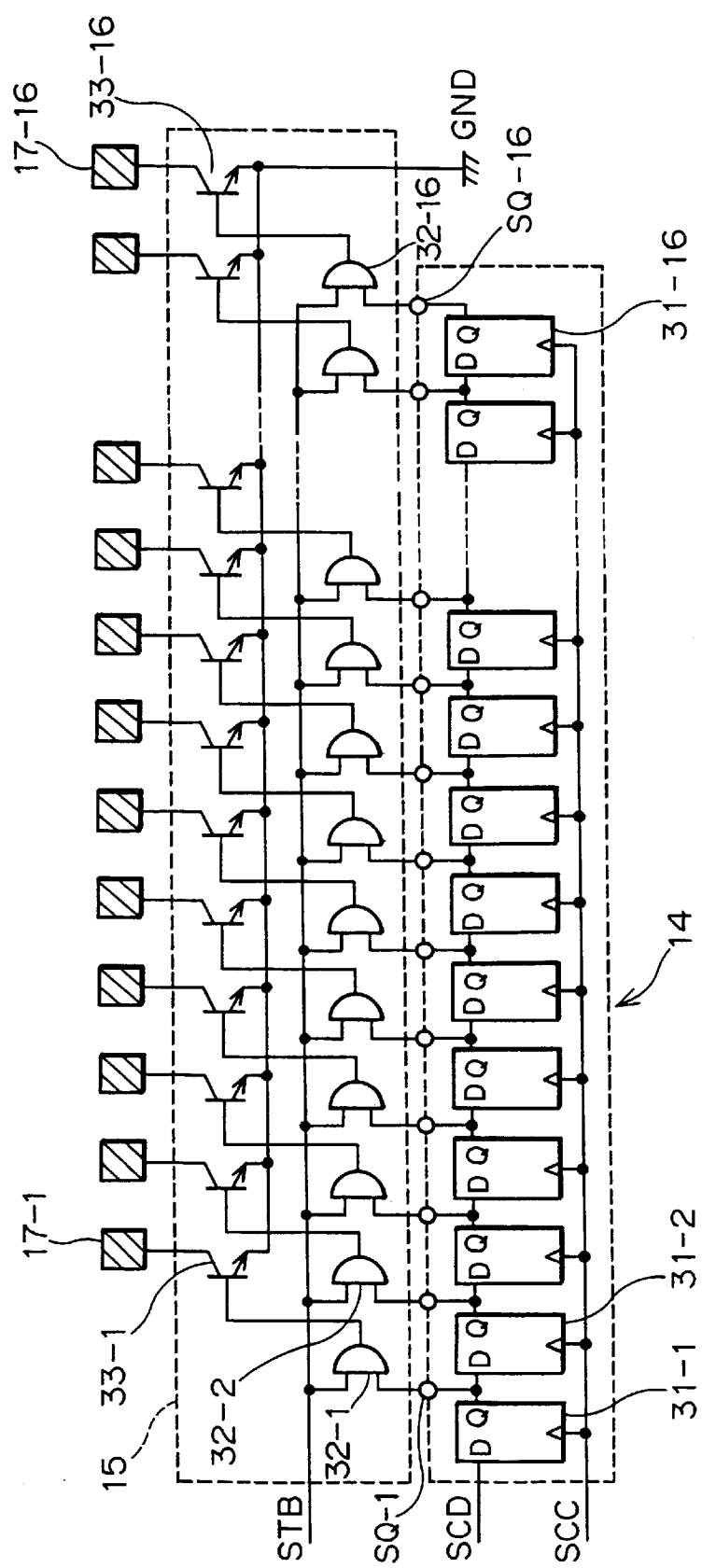
FIG. 5 is a block diagram of the scan control unit in the LED array drive IC constituting the print head in the embodiment of the present invention.

FIG. 5 illustrates the structure of the scan control unit of the LED array drive IC 10. As shown in FIG. 5, the scan data shift register 14 is provided with N D flip-flops 31-1 through 31-N that are connected in series and N scan output terminals SQ-1 through SQ-N. The data input terminal D of the D flipflop 31-1 at the first stage is connected to the scan data input terminal SCD. The output terminal of the D flip-flop 31-i is connected to the scan output terminal SQ-i. In addition, the clock input terminals of the N D flipflops 31 are commonly connected to the scan clock input terminal SCC.

The scan circuit 15 is provided with N AND gates 32-1 through 32-N and N switching transistors 33-1 through 33-N. First input terminals of the N AND gates 32 are commonly connected with the strobe input terminal STB. In addition, the second input terminal of the AND gate 32-i is connected to the scan output terminal SQ-i of the scan data shift register 14. The emitter electrodes of the N switching transistors 33 are grounded (are commonly connected to the GND). The base terminal of the switching transistor 33-i is connected to the output terminal of the AND gate 32-i whereas its collector terminal is connected to the scan pad electrode 17-i. The AND gate 32-i and the switching transistor 33-i constitute a switching circuits in the scan control unit.

Different sets of printing data and light quantity correction data, i.e., sets of printing data and light quantity correction data matching the corresponding LED array chips 1, are input through the data input terminals DI1 through DI4 of the plurality of LED array drive ICs 10 mounted at the mounting substrate 41. The printing data and the light quantity correction data are input from the outside of the mounting substrate 41 via the wiring (conductive pattern) pattern (not shown) at the mounting substrate and metal wires 43. In addition, a single shift clock is input through the shift clock input terminals SFC of all the LED array drive ICs 10. Likewise, a common scan clock, a common set of scan data and a common strobe signal are input through the scan clock input terminals SCC, the scan data input terminals SCD and the strobe input terminals STB respectively of all the LED array drive ICs 10.

Figure 6:
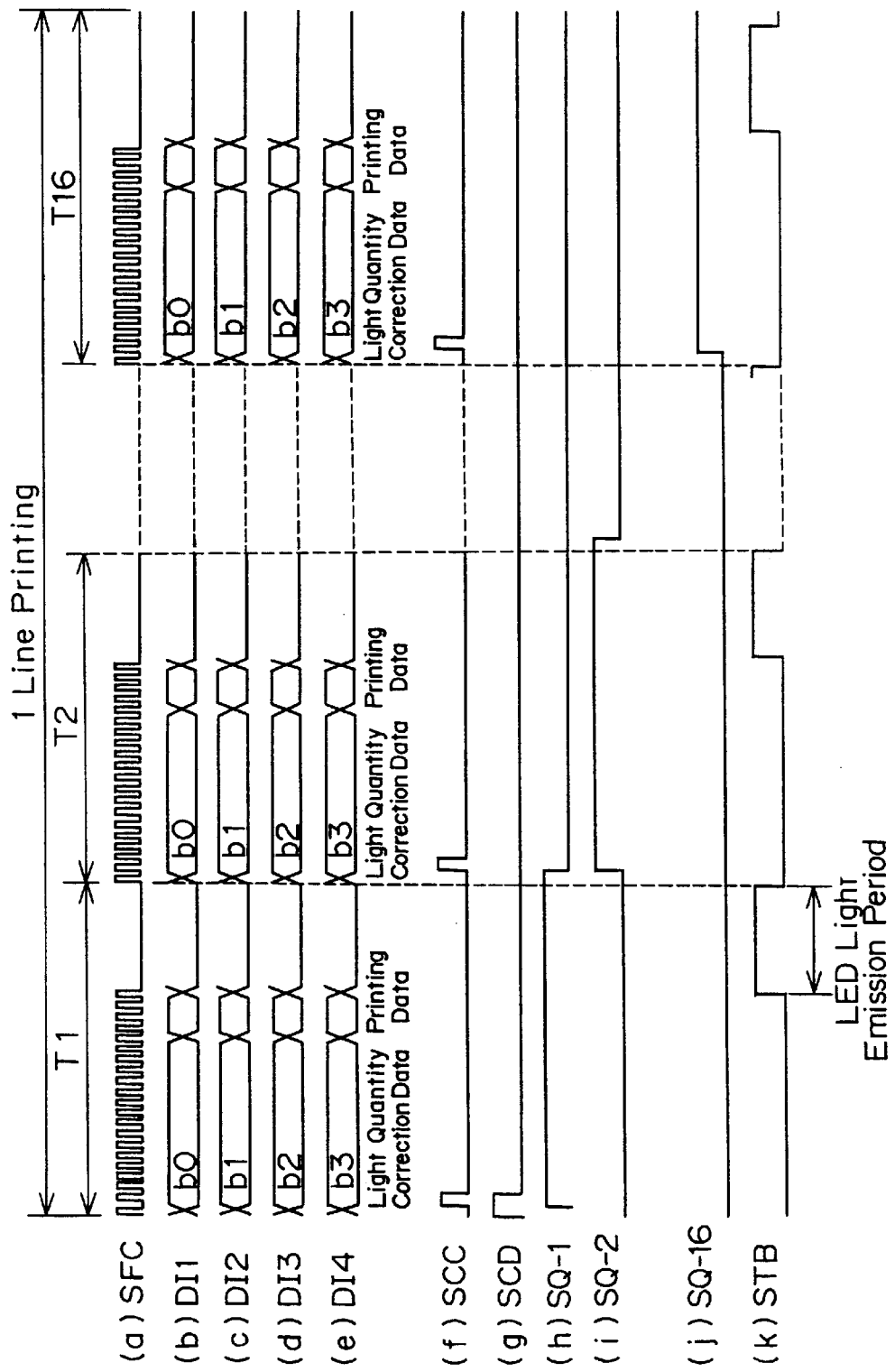
FIG. 6 is a time chart of the operation performed by the LED array drive IC constituting the print head in the embodiment of the present invention.

Next, the operation of the LED array drive IC 10 is explained. FIG. 6 is a time chart of the operation of the LED array drive IC 10. In FIG. 6, (a) indicates the shift clock input through the shift clock input terminal SFC, (b) through (e) indicate printing data and light quantity correction data input through the data input terminals DIII through D14, (f) indicates the scan clock input through the scan clock input terminal SCC and (g) indicates the scan data input through the scan data input terminal SCD. In addition, (h) through (j)

indicate the waveforms at the scan output terminals SQ-1, SQ-2 and SQ-16 of the scan data shift register 14, and (k) indicates the strobe signal input through the strobe input terminal STB. The shift clock indicated by (a) constitutes an operating clock for the printing data shift register 11 and the light quantity correction data shift register 12, whereas the scan clock indicated by (f) constitutes an operating clock for the scan data shift register 14. The scan data indicated by (g) are used to sequentially cause the blocks 7-1 through 7-16 (their LED elements 2) of the LED array 1 to emit light and the strobe signal indicated by (k) is a signal for controlling the length of light emission time for the LED elements 2.

It is a prerequisite that the light quantity correction data have been set before starting the operation of the LED array drive IC 10. It is necessary to individually correct the quantities of emitted light since there is a certain degree of deviation in the light emitting characteristics of the LED elements 2-1 through 2-256 of the LED array chip 1. The setting of the light quantity correction data may be implemented by following the procedure explained below, for instance. The LED elements 2 of the LED array chip 1 are caused to emit light one at a time, and by setting the drive current at varying values, the drive current value at which the quantity of the emitted light achieves a reference light quantity is measured. This measurement is performed for all 256 of the LED elements 2. Then, based upon the difference between the drive current value (the measured current value) at which the reference light quantity is achieved and the reference current value, the light quantity correction data for each LED element 2 are set. In this embodiment, the light quantity correction data are 4-bit data and written in a memory device such as a ROM. Now, the drive current source circuits 23 of the LED array drive IC 10 each output a constant current determined by subtracting the correction current value based upon the light quantity correction data from the reference current value which may, for instance, 3 mA. By inputting the light quantity correction data that have been set as described above to the drive current source circuits 23, the drive current at the value at which the reference light quantity is achieved are output from the drive current source circuits 23 so that all the LED elements 2 emit light at the reference light quantity.

Back to the explanation of the operation of the LED array drive IC 10, its operation during the scan period T1 illustrated in FIG. 6, in particular, is now described. Sets of 4-bit light quantity correction data b0-1 through b0-16, b1-1 through b1-16, b2-1 through 2-16 and b 3-1 through b 3-16 and sets of 1-bit printing data Q-1 through Q-16 that correspond to the LED elements 2-1 through 2-16 at the block 7-1 are input through the data input terminals DI1 through DI4. In this explanation, b0-1, b1-1, b2-1 and b3-16 indicate the light quantity correction data corresponding to the LED element 2-1 and Q-16 indicates the printing data corresponding to the LED element 2-16, for instance. The 1-bit printing data indicate whether or not the corresponding LED element 2 is to emit light.

Figure 7:
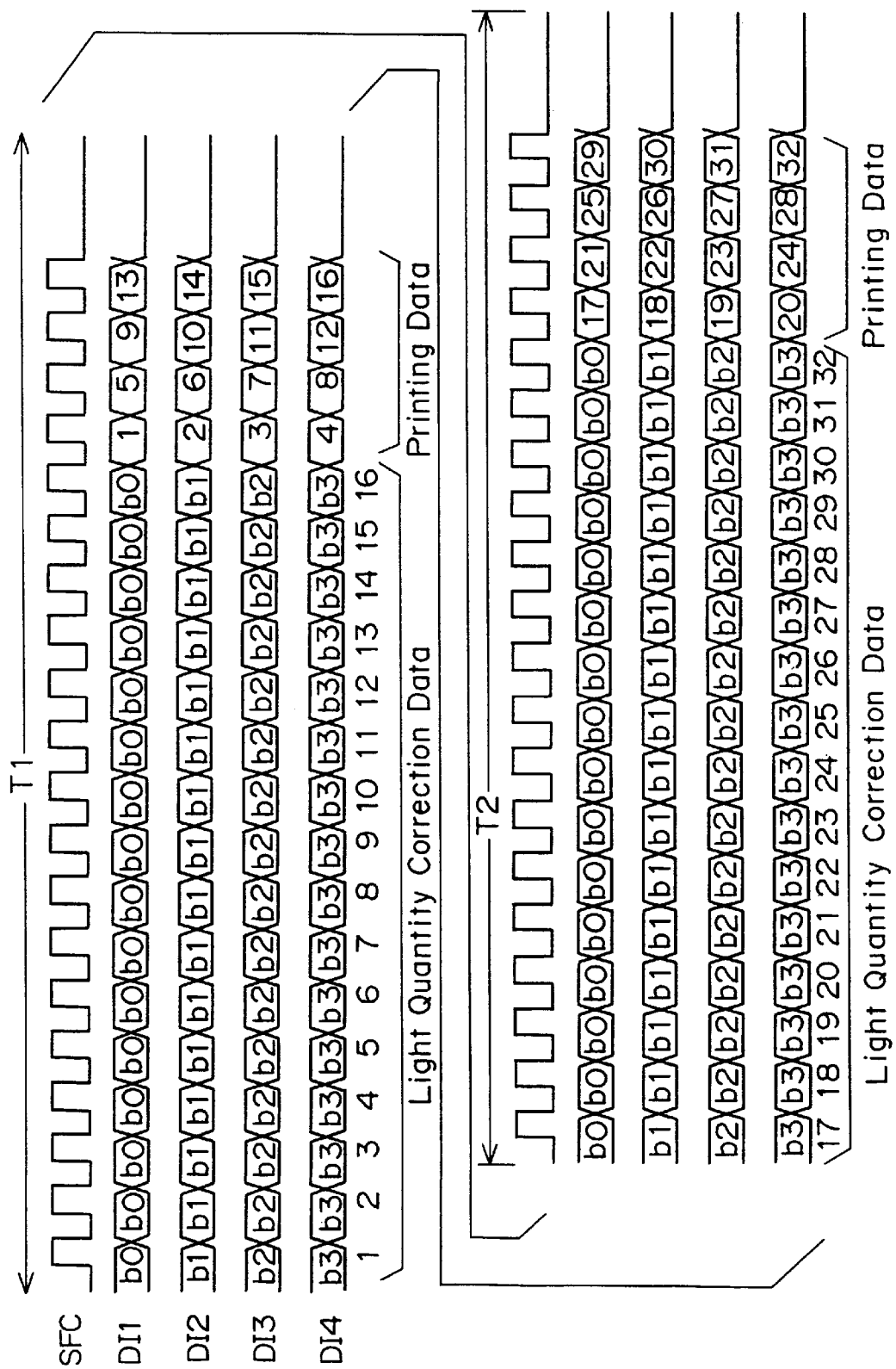
FIG. 7 illustrates the data transfer format for the LED array drive IC constituting the print head in the embodiment of the present invention.
Figure 8:
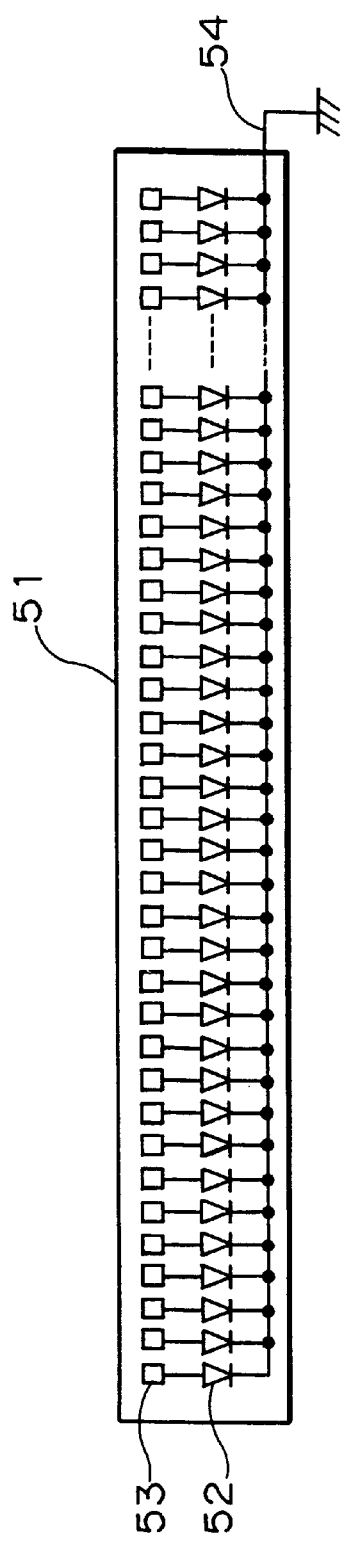
FIG. 8 is a block diagram of an LED array chip in the prior art.
Figure 9:
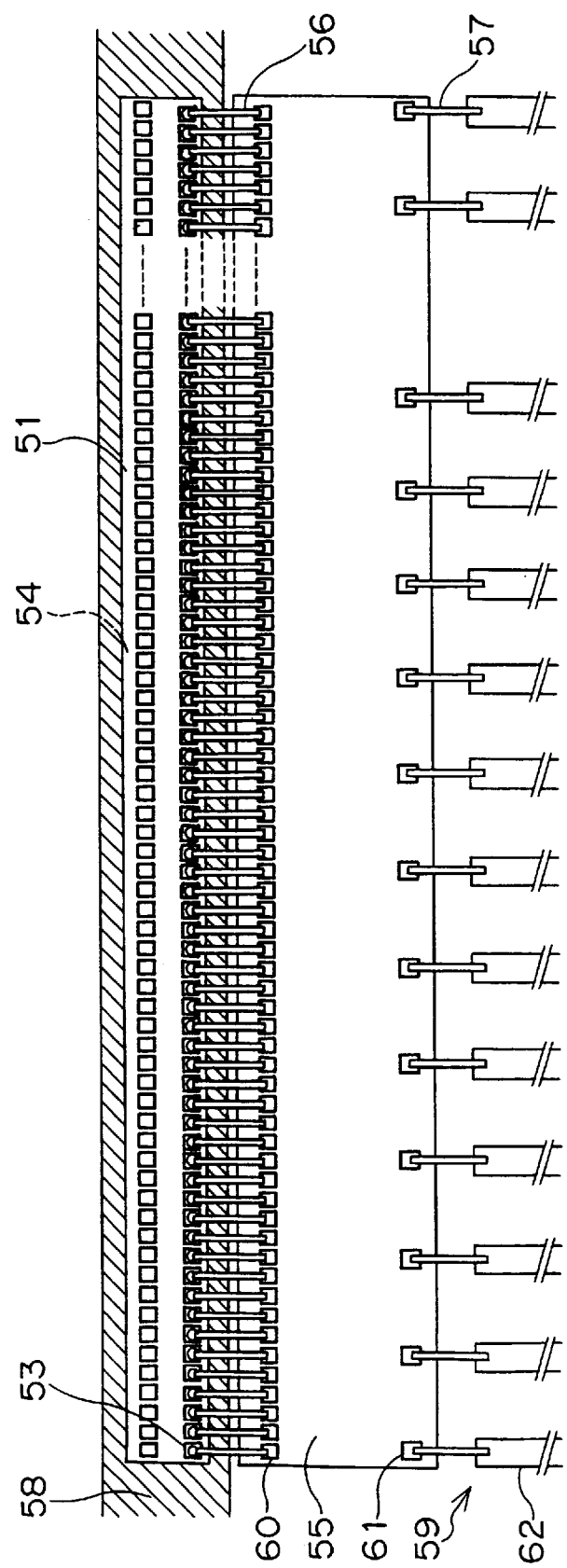
FIG. 9 is a structural diagram of a print head employing the LED array chip in the prior art.

FIG. 7 illustrates the data transfer format for the LED array drive IC 10. As illustrated in FIG. 7, the light quantity correction data are input ahead of the printing data. During the period T1, the bit data b0-1 through b0-16 in the light quantity correction data and the printing data Q-1, Q-5, Q-9 and Q-13 are input through the data input terminal DI1. In addition, the bit data b1-1 through b1-16 in the light quantity correction data and the printing data Q-2, Q-6, Q-10 and Q-14 are input through the data input terminal DI2. Likewise, the bit data b2-1 through b2-16 in the light quantity correction data and the printing data Q-3, Q-7, Q-11 and Q-15 are input through the data input terminal DI3 and the bit data b3-1 through b3-16 in the light quantity correction data and the printing data Q-4, Q-8, Q-12 and Q-16 are input through the data input terminal DI4.

The data that have been input through the input terminals DI1 through D14 shift the printing data shift register 11 and the light quantity correction shift register 12 using the shift clock input through the terminal SFC, and the light quantity correction data are stored at the light quantity correction shift register 12 with the printing data stored at the printing data shift register 11. The light quantity correction data for the LED element 2-i are stored at the D flipflops 22-(1, i) through 22-(4, i) of the light quantity correction register 12. In addition, the printing data corresponding to the LED element 2-i are stored at the D flipflop 21-i of the printing data shift register 11.

The 4-bit light quantity correction data b0-i, b1-i, b2-i and b3-i stored at the light quantity correction shift register 12 are input through the drive current source circuit 23-i of the drive circuit 13, and the drive current source circuit 23-i, in turn, sets the drive current value in correspondence to the input light quantity correction data. In addition, the second input terminal of the AND gate 24-1 of the drive circuit 13 is set to either "H" or "L" level in conformance to the printing data Q-i stored at the printing data shift register 11. At this point, the first input terminals of the AND gates 24-1 through 24-16 are set to "L" and the switching transistors 25-1 through 25-16 are in an OFF state.

In addition, during the scan period T1, the scan data at "H" level indicated by (g) in FIG. 6 are input through the terminal SCD, and these scan data are stored at the D flipflop 31-1 of the scan data shift register 14 using the scan clock input through the terminal SCC. This shifts the scan output terminal SQ-1 of the scan data shift register 14 from "L" level to "H" level, with the scan output terminals SQ-2 through SQ-16 remaining at "L". At the scan circuit 15, the second input terminal of the AND gate 32-1 shifts from "L" level to "H" level while the second input terminals of the AND gates 32-2 through 32-16 remain at "L" level. At this point, the first input terminals of the AND gates 32-1 through 32-16 are at "L" level, with the switching transistors 33-1 through 33-16 set in an OFF state.

In this state, if the strobe signal input through the terminal STB shifts from "L" level to "H" level as indicated by (k) in FIG. 6, the first input terminals of the AND gates 32-1 through 32-16 shift to "H" level and the switching transistor 33-1 is turned on in the scan circuit 15 so that the scan pad electrode 17-1 becomes valid and connected to the GND. At the same time, at the drive circuit 13, the first input terminals of the AND gates 24-1 through 24-16 shift to "H" level. If the printing data Q-i are at "H" level, the switching transistor 25-i becomes turned on, and a drive current flows from the drive current source circuit 23-i through a path extending from the drive pad electrode 16-i through the pad electrode to be driven 3-i, the LED element 2-i and the pad electrode to be scanned 4-1 to the scan pad electrode 17-1 to cause the LED element 2-i to emit light. The LED element 2-i sustains light emission during the period of time over which the strobe signal is at "H" level. In addition, if the printing data Q-i are at "L" level, the LED element 2-i does not emit light. Thus, during the period T1, the LED elements 2-1 through 2-16 at the block 7-1 are selectively caused to engage in a light emitting operation in conformance to the printing data Q-1 through Q-16.

Next, during the scan period T2, the light quantity correction data and the printing data that correspond to the LED elements 2-17 through 2-32 at the block 7-2 are stored at the light quantity correction data shift register 12 and the printing data shift register 11 respectively through the data transfer format presented in FIG. 7. Namely, the light quantity correction data corresponding to the LED element 2-(2, i) ((2, i)=16+i) are stored at the D flipflops 22-(1, i) through 22-(4, i) of the light quantity correction register 12. In addition, the printing data corresponding to the LED element 2-(2, i) are stored at the D flipflop 21-i of the printing data shift register 11. Furthermore, during the period T2, when the scan clock is input through the terminal SCC, the "H" scan data that have been stored at the D flipflop 31-1 shift to the D flipflop 31-2 at the scan data shift register 14, the scan output terminal SQ-1 is reset to "L" and the scan output terminal SQ-2 shifts to "H" level.

At this point, if the strobe signal input through the terminal STB is set to "H" level, the switching transistor 33-2 is turned on at the scan circuit 15 so that the scan pad electrode 17-2 becomes valid and connected to the GND. At the same time, the first input terminals of the AND gates 24-1 through 24-16 shift to "H" level at the drive circuit 13. If the printing data Q-(16+i) are at "H" level, a corrected drive current flows from the drive current source circuit 23-i through a path extending from the drive pad electrode 16-i through the pad electrode to be driven 3-i, LED element 2-(2, i) and the pad to be scanned 4-2 to the scan pad electrode 17-2 to cause the LED element 2-(2, i) to emit light at a reference light quantity. Through the operation described above, the LED elements 2-17 through 2-32 (2-(2, 1) through 2-(2, 16)) at the block 7-2 are selectively caused to engage in a light emitting operation in correspondence to the printing data Q-17 through Q-32 during the period T2.

By repeating the sequence of operations similar to that implemented during the scan periods T1 and T2 sixteen times until the scan period T16 is completed, all the LED elements 2-1 through 2-256 at the LED array chip 1 can be selectively caused to emit light.

Thus, in this embodiment of the present invention, by providing the pad electrodes to be driven 3-1 through 3-N and the pad electrodes to be scanned 4-1 through 4-M of the matrix-type LED array chip 1 along one side at the lengthwise side of the chip and by mounting the LED array drive IC 10 internally provided with the scan control unit and the data control unit on the side where the pad electrodes are formed at the LED array chip 1, it becomes possible to directly bond the LED array chip 1 to the LED array drive IC 10 from one side of the chip to achieve a reduction in the number of wiring (conductive pattern) patterns at the mounting substrate 41. In addition, since it is not necessary to mount two types of drive ICs (a scan control IC and a data control IC) to constitute the drive IC for the matrix-type LED array chip 1 and only the LED array drive IC 10 is required, the number of drive ICs can be reduced. As a result, space saving, i.e., a reduction in size of the LED print head is achieved, and furthermore, through reductions in the number of manufacturing steps and in the cost of parts, the overall production costs can be reduced. Moreover, an improvement in the reliability is achieved by directly bonding the LED array chip 1 and the LED array drive IC 10.

While the light emitting element array chip and the light emitting element array drive IC according to the present invention have been particularly shown and described with respect to a preferred embodiment thereof by referring to the attached drawings, the present invention is not limited to this example and it will be understood by those skilled in the art that various changes in form and detail may be made therein without departing from the spirit, scope and teaching of the invention.

For instance, the printing data shift registers given and the light quantity correction shift registers 12 of all the LED array drive ICs 10 mounted at the mounting substrate 41 may be connected in series by alternately connecting the data input terminals DI and the data output terminal DO of every two LED array drive ICs 10. In other words, a data output terminal DOk of the LED array drive IC 10 at a preceding stage may be connected to the data input terminal DIk of an LED array drive IC 10 at a second or subsequent stage, with the printing data and the light quantity correction data input through the data input terminals DI1 through DI4 of the LED array drive IC 10 at the first stage from the outside of the mounting substrate 41. In this case, instead of transferring the printing data and the light quantity correction data to the LED array drive IC 10 for each light emitting operation, as in the embodiment described earlier, it is possible to cause the LED element arrays to engage in a light emitting operation continuously after transferring the printing data and the light quantity correction data corresponding to one line (equivalent of 16 light emitting operations) to increase the printing speed per line.

In addition, while the printing data and the light quantity correction data are input as serial data in the embodiment described earlier, they may be input in parallel to achieve a structure in which the printing data shift register 11 and the light quantity correction shift register 12 at the LED array drive IC 10 are not connected in series. Moreover, the printing data shift registers 11 and the light quantity correction shift registers 12 of all the LED array drive ICs 10 mounted at the mounting substrate 1 may be separately connected in series.

As has been explained, the light emitting element array according to the present invention contributes to achieving a reduction in the size of the print head and a reduction in the production costs with its pad electrodes to be scanned and its pad electrodes to be driven along one side at the lengthwise side of the chip.

In addition, the light emitting element array drive IC according to the present invention which is internally provided with both a scan control unit and a data control unit, contributes to achieving a reduction in the size of the print head and a reduction in the production costs, since it is capable of driving a matrix-type light emitting element array by itself.

Furthermore, the print head according to the present invention achieves an advantage in that a reduction in the size and a reduction in the production costs are achieved by employing the light emitting element array according to the present invention or the light emitting element array drive IC according to the present invention.

The entire disclosure of Japanese Patent Application No. 9-173630 filed on Jun. 30, 1997 including specification, claims, drawings and summary is incorporated herein by reference in its entirety.

What is claimed is:

1. A light emitting elements array chip comprising:
   a plurality of light emitting elements;
   a plurality of pad electrodes to be scanned positioned along one side on a lengthwise side of said chip, and to which first electrodes of said light emitting elements are connected;
   a plurality of pad electrodes to be driven positioned along the same side as a position of said pad electrodes to be scanned at said lengthwise side of said chip, and to which second electrodes of said light emitting elements are connected; and wirings (conductive patterns) for matrix-connecting said first electrodes and said second electrodes of said plurality of light emitting elements with said pad electrodes to be scanned and said pad electrodes to be driven.

2. A light emitting element array chip according to claim 1, wherein:
said plurality of pad electrodes to be scanned and said plurality of pad electrodes to be driven are provided in a single row or over two rows.

3. A light emitting element array chip according to claim 2, wherein:
said pad electrodes to be scanned and said pad electrodes to be driven are positioned alternately.

4. A light emitting element array chip according to claim 2, wherein:
said plurality of pad electrodes to be scanned and said plurality of pad electrodes to be driven are provided in a single row.

5. A light emitting element array drive IC for driving a light emitting element array achieved by matrix-connecting M×N light emitting elements to M pad electrodes to be scanned and N pad electrodes to be drive, provided with:
a scan control unit that scans said M pad electrodes to be scanned by sequentially validating said M pad electrodes to be scanned one at a time with timing in conformance with a scan signal input; and
a data control unit that selectively drives said N pad electrodes to be driven and selectively causes N light emitting elements connected to a pad electrode to be scanned which has become valid to emit light, based upon individual sets of data corresponding to said light emitting elements input, every time a valid pad electrode to be scanned is switched; and wherein respective connections for said M pad electrodes to be scanned and said N pad electrodes to be driven are positioned along one side on a lengthwise side of said drive IC, and said connections for said M pad electrodes to be scanned and said N pad electrodes to be driven are provided in a single row or over two rows.

6. A light emitting element array drive IC according to claim 5, wherein:
said scan control unit is provided with;
a means for selection having M scan output terminals corresponding to said M pad electrodes to be scanned respectively, which selects said M scan output terminals one at a time based upon said scan signal; and
a means for scanning that validates a pad electrode to be scanned corresponding to a scan output terminal that has been selected by grounding said pad electrode to be scanned.

7. A light emitting element array drive IC according to claim 6, wherein:
said scan signal is constituted of scan data that are input only at a start of scan and a scan clock having a frequency corresponding to a scan period for one pad electrode to be scanned;
said means for selection is provided with scan data shift registers over M stages that use said scan data as input data and operate based upon said scan clock, with outputs of said registers at individual stages respectively connected with said M scan output terminals; and
said means for scanning is provided with scan pad electrodes to be individually connected with said pad electrodes to be scanned, and switching circuits that are set to ON when a corresponding scan output terminal is selected.

8. A light emitting element array drive IC according to claim 5, wherein:
said individual sets of data are constituted of drive data that indicate whether or not a light emitting element is to emit light and light quantity (emitted light power) correction data for correcting a quantity of light (emitted light power) to be emitted by said light emitting element; and
said data control unit is provided with a means for drive data storage for storing said drive data, a means for light quantity correction data storage for storing said light quantity (emitted light power) correction data, and a means for drive that individually setting drive current values for said N light emitting elements based upon said individual sets of data and selectively supplies said drive currents to said N pad electrodes to be driven.

9. A light emitting element array drive IC according to claim 8, wherein:
said drive data and said light quantity correction data are both input as serial data;
said means for drive data storage is provided with a drive data shift register; and
said means for light quantity (emitted light power) correction data storage is provided with a light quantity (emitted light power) correction data shift register.

10. A light emitting element array drive IC according to claim 9, wherein:
said drive data and said light quantity correction data are input as serial data; and
said drive data shift register and said light quantity correction data shift register are connected in series.

11. A light emitting element array drive IC according to claim 8, wherein:
said means for individually setting drive current values is provided with;
drive source circuits capable of varying an output current value in conformance to said light quantity correction data;
drive pad electrodes to be individually connected with said pad electrodes to be driven; and
switching circuits individually provided between output terminals of said drive source circuits and said drive pad electrodes, which are set to ON/OFF in conformance with said drive data.

12. A print head, comprising:
light emitting element array chips achieved by matrix-connecting M×N light emitting elements with M pad electrodes to be scanned and N pad electrodes to be driven;
light emitting element array drive circuits (drive IC chips) for driving said light emitting element array chips; and
a mounting substrate at which said light emitting element array chips and said light emitting element array drive circuits (drive IC chips) are mounted; wherein:
said light emitting element array chips each comprises;
a plurality of light emitting elements provided in a single row;
a plurality of pad electrodes to be scanned positioned along one side on a lengthwise side of said chip, and to which first electrodes of said light emitting elements are connected;
a plurality of pad electrodes to be driven positioned along the same side as a position of said pad electrodes to be scanned at said lengthwise side of said chip, and to which second electrodes of said light emitting elements are connected; and wirings (conductive patterns) for matrix-connecting said first electrodes and said second electrodes of said plurality of light emitting elements with said pad electrodes to be scanned and said pad electrodes to be driven.

13. A print head according to claim 12, wherein:

said plurality of pad electrodes to be scanned and said plurality of pad electrodes to be driven are provided in a single row or over two rows.

14. A print head according to claim 13, wherein:

said pad electrodes to be scanned and said pad electrodes to be driven are positioned alternately.

15. A print head according to claim 14, wherein:

said plurality of pad electrodes to be scanned and said plurality of pad electrodes to be driven are provided in a single row.

16. A print head, comprising:

at least one light emitting elements array chip achieved by matrix-connecting M×N light emitting elements with M pad electrodes to be scanned and N pad electrodes to be driven, with said M pad electrodes to be scanned and said N pad electrodes to be driven being positioned along one side on a lengthwise side of said array chip; and with said M pad electrodes to be scanned and said N pad electrodes to be driven being provided in a single row or over two rows;

light emitting element array drive ICs for driving said light emitting element arrays; and a mounting substrate at which said light emitting element arrays and said light emitting element array drive ICs are each mounted; wherein;

said light emitting element array drive IC is provided with;

a scan control unit that scans said M pad electrodes to be scanned by sequentially validating said M pad electrodes to be scanned one at a time with timing in conformance with a scan signal input; and a data control unit that selectively drives said N pad electrodes to be driven and selectively causes N light emitting elements connected to a pad electrode to be scanned which has become valid to emit light, based upon individual sets of data corresponding to said light emitting elements input, every time a valid pad electrode to be scanned is switched.

17. A print head according to claim 16, wherein:

said scan control unit at said light emitting element array drive IC is provided with;

a means for selection having M scan output terminals corresponding to M pad electrodes to be scanned respectively, which selects said M scan output terminals one at a time based upon said scan signal; and a means for scanning that validates a pad electrode to be scanned corresponding to a scan output terminal that has been selected by grounding said pad electrode to be scanned.

18. A print head according to claim 17, wherein:

said scan signal is constituted of scan data that are input only at a start of scan and a scan clock having a frequency corresponding to a scan period for one pad electrode to be scanned;

said means for selection is provided with scan data shift registers over M stages that use said scan data as input data and operate based upon said scan clock, with outputs of said registers at individual stages respectively connected with said M scan output terminals; and said means for scanning is provided with scan pad electrodes to be individually connected with said pad electrodes to be scanned and switching circuits individually provided between said ground source and said scan pad electrodes, that are set to ON when a corresponding scan output terminal is selected.

19. A print head according to claim 16, wherein:

said individual sets of data are constituted of drive data that indicate whether or not a light emitting element is to emit light and light quantity (emitted light power) correction data for correcting a quantity of light (emitted light power) to be emitted by said light emitting element; and said data control unit is provided with a means for drive data storage for storing said drive data, a means for light quantity correction data storage for storing said light quantity correction data and a means for drive that individually sets drive current values for said N light emitting elements based upon said individual sets of data and selectively supplies said drive currents to said N pad electrodes to be driven.

20. A print head according to claim 19, wherein:

said drive data and said light quantity correction data are both input as serial data;

said means for drive data storage is provided with a drive data shift register; and said means for light quantity correction data storage is provided with a light quantity correction data shift register.

21. A print head according to claim 20, wherein:

said drive data and said light quantity correction data are input as serial data; and said drive data shift register and said light quantity correction data shift register are connected in series.

22. A print head according to claim 21, wherein:

said drive data shift register and said light quantity correction data shift register which are connected in series at each of said plurality of light emitting element array drive ICs are further connected in series.

23. A print head according to claim 19, wherein:

said means for drive at said light emitting element array drive IC is provided with;

drive source circuits capable of varying an output current value in conformance to said light quantity correction data;

drive pad electrodes to be individually connected with said pad electrodes to be driven; and switching circuits individually provided between output terminals of said drive source circuits and said drive pad electrodes, which are set to ON/OFF in conformance with said drive data.

* * * * *